US006173896B1

(12) United States Patent
Mürl

(10) Patent No.: US 6,173,896 B1
(45) Date of Patent: Jan. 16, 2001

(54) NUMBERED DATA CARRIERS AND A METHOD FOR PRODUCTION THEREOF

(75) Inventor: Gerhard Mürl, Wasserberg/Inn (DE)

(73) Assignee: Giesecke & Devrient GmbH (DE)

( * ) Notice: Under 35 U.S.C. 154(b), the term of this patent shall be extended for 0 days.

(21) Appl. No.: 09/154,984

(22) Filed: Sep. 17, 1998

(30) Foreign Application Priority Data

Sep. 17, 1997 (DE) ............................................. 197 40 920

(51) Int. Cl.[7] ..................................................... G06K 19/00
(52) U.S. Cl. ............................ 235/487; 235/375; 283/74
(58) Field of Search .................................... 235/487, 375, 235/493; 283/58, 72, 74, 903, 114; D14/114.4, 114.8; D19/26; 101/72, 76, 78, 79

(56) References Cited

U.S. PATENT DOCUMENTS

| | | | | |
|---|---|---|---|---|
| 2,661,896 | * | 12/1953 | Luhn | 235/1 R |
| 4,055,116 | * | 10/1977 | Roberts et al. | 101/79 |
| 4,072,100 | * | 2/1978 | Polo | 101/79 |
| 4,234,214 | * | 11/1980 | Lee | 283/57 |
| 4,634,148 | * | 1/1987 | Greene | 283/70 |
| 4,645,240 | * | 2/1987 | Whitehead et al. | 283/74 |
| 4,733,887 | * | 3/1988 | Mowry, Jr. | 283/58 |
| 4,958,066 | * | 9/1990 | Hedgcoth | 235/487 |
| 5,062,666 | * | 11/1991 | Mowry et al. | 283/67 |
| 5,292,283 | * | 3/1994 | Koper et al. | 462/18 |
| 5,445,418 | * | 8/1995 | Blend | 283/58 |
| 5,502,304 | * | 3/1996 | Berson et al. | 250/271 |
| 5,516,362 | * | 5/1996 | Gundjian et al. | 106/22 B |
| 5,693,693 | * | 12/1997 | Auslander et al. | 524/88 |
| 5,749,291 | * | 5/1998 | Nast et al. | 101/91 |

FOREIGN PATENT DOCUMENTS

| | | | |
|---|---|---|---|
| 146019 | | 6/1931 | (CH) . |
| 0 439 909 A2 | | 7/1991 | (EP) . |
| 2 073 463 | | 10/1981 | (GB) . |
| 2266395 | * | 10/1993 | (GB) . |

* cited by examiner

*Primary Examiner*—Thien M. Le
*Assistant Examiner*—J Yven
(74) *Attorney, Agent, or Firm*—Bacon & Thomas PLLC

(57) ABSTRACT

A numbered data carrier and method for producing the same, wherein the data carrier includes a document of value and at least one security element having a serial number that individualizes the data carrier out of a series of data carriers. The security element includes first and second parts. The first part of the security element partly represents the serial number and the second part of the security element represents the serial number either partly or completely. The security element is applied on the document.

22 Claims, 2 Drawing Sheets

NUMBERED DATA CARRIERS AND A METHOD FOR PRODUCTION THEREOF

SUMMARY OF THE INVENTION

1. Field of the Invention

This invention relates to a data carrier such as a paper of value, ID card, bank note, package or the like having at least one security element applied thereto which has a serial number individualizing the data carrier out of a series of data carriers, and to a method for producing the data carrier.

2. Description of the Related Art

To increase forgyey-proofness and to identify docunents such as bank notes, checks, ID cards, credit cards or the like one applies consecutive numberings to these documents, usually printing this so-called "serial number" on the completed data carrier. This printed serial number individualizes the data carrier, i.e. gives it an individual and unique feature clearly identifying the data carrier out of a series of otherwise identical data carriers.

For applying serial numbers to the data carrier one customarily uses a numbering machine provided in a numbering station, the data carriers to be numbered running through the numbering station either as single copies or still in the sheet with a plurality of copies and thereby being provided with the serial number.

For applying the serial number to a security document, DE-OS 1 486 894 discloses a method wherein a consecutive serial number is applied to the document with the aid of a numbering machine, the numbering machine having figure rolls which are advanced by one count after each print of a number. This multidigit serial number can be provided on the document several times and be applied horizontally or vertically depending on the requirement. To protect the document of value further, it is possible to apply this serial number with a special ink which ensures better protection of the document against falsification and moreover permits a simple check of the correct numbering and adjustment, i.e. of correct application of the serial number. For this purpose, magnetic inks are proposed for example, so that the numbering can be read mechanically with the aid of suitable detectors.

To increase the forgery-proofness of documents of value, EP 0 061 795 B1 further proposes providing an additional code number on the document. This code number is applied to the document by a figure roll disposed equiaxially with the numbering machine and is controllable in accordance with the particular adjustment of the figure rolls of the serial number. This makes it possible to produce an additional code number which is produced in accordance with the printed serial number and applied together therewith.

To improve the security of numbered documents of value, EP 0 160 504 B1 further proposes providing the serial number on a document in such a way that at least two characters of the serial number differ in their height, width, type font or in a combination of these properties.

SUMMARY OF THE INVENTION

The invention is thus based on the problem of providing numbered documents with a security element which, firstly, ensures individualization of the single documents out of a series of documents and, secondly, improves the forgery-proofliess of the numbered documents.

This problem is solved by the features of the independent claims.

According to the present invention, a data carrier such as a document of value is provided with a security element which has a serial number, this security element consisting of two parts. The first part of the security element has only part of the serial number, while the second part of the security element has another part or the entire serial number.

During production of the data carrier, the two parts of the security element are applied to the document in a defined position relative to each other with a separate numbering apparatus in each case. The numbering apparatus used in each case is in particular a numbering machine having figure wheels. At the places on the numbering machine where the serial number is incomplete there are figure wheels with a blind numbering, i.e. figure wheels bearing no figures. The effect of this blind numbering is that no figures are transferred to the document at these places, so that the applied number represents the serial number only partly. Since the two parts of the security element are applied to the data carrier with different numbering machines, it is possible to design the first part of the security element so that it represents the serial number only partly, while the second part of the security element can be executed so that it renders the serial number partly or completely. The security element can in particular be executed so that the two individual parts each represent the serial number only partly, the two parts being applied to the document in such a way as to complement each other to form the complete serial number. The first and second parts jointly form the inventive security element.

If two numbering machines optionally having a blind numbering at one or more places are used in a numbering station, it is possible for the first time to represent the serial number in two different color tones. Thus, the figure sequence assigned to the first part of the security element can be represented in a completely different color from the figure sequence assigned to the second part of the security element. Positionally accurate guidance of the document within the numbering station ensures that after the application of the first part of the security element, i.e. the first, incomplete figure sequence of the serial number, the document is supplied to the second numbering device in an accurate position and the second part of the security element, i.e. the second, likewise incomplete part of the serial number or the complete serial number, is applied to the document here. The combination of the first part with the second part thus yields a complete serial number, or the incomplete serial number of the first part of the security element is completed by at least one figure of the second part of the security element. It is irrelevant with this procedure which part of the security element is applied to the data carrier as the first and which as the second.

The use of two different numbering machines in a numbering station for applying the first and second parts of the security element makes it necessary that the data carrier to be printed with the serial number be guided through the numbering station as a single data carrier or as a multiple-copy panel, for example in sheet format, in such a way that it is supplied to both numbering apparatuses in an accurate position. This makes it possible to apply the two parts of the security element to the data carrier in a defined position relative to each other, so that the two parts of the security element are present on the data carrier with the desired exact registration.

The term "figures" in the context of this invention refers to be all characters or symbols, in particular also letters, which are suitable for rendering a serial number.

BRIEF DESCRIPTION OF THE DRAWINGS

Further advantages and advantageous embodiments of the invention will result from the figures described in the following, which in the interests of clarity are not true-to-scale.

DESCRIPTION OF THE PREFERRED EMBODIMENTS

Figure 1:
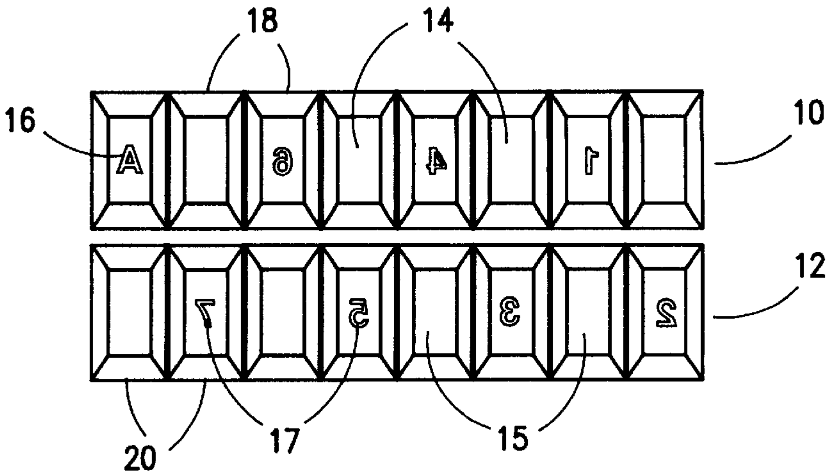
FIG. 1 shows two figure blocks of two different numbering machines.

FIG. 1 schematically shows eight adjacent figure blocks 18 of first figure sequence 10 from a first numbering machine and eight adjacent figure blocks 20 of second figure sequence 12 of a second numbering machine. On individual figure blocks 18, 20 figure blocks with FIGS. 16 and figure blocks with blind numbering 14 are provided alternatingly in figure sequence 10. In second figure sequence 12 belonging to a second numbering apparatus, figure blocks 20 bear FIGS. 17 at the places where figure sequence 10 has blind FIGS. 14, while blind FIGS. 15 of figure sequence 12 are accordingly provided at the places where FIGS. 16 are provided in sequence 10. The first and second numbering machines are provided in a numbering station for numbering documents in such a way that figure sequence 10 is printed on the document first. Positionally accurate guidance of the document within the numbering station relative to the second numbering machine makes it possible to provide the document with the second figure sequence m exact register, the second figure sequence being applied to the document in the present case in such a way that the complete serial number, consisting of a combination of FIGS. 16 of first figure sequence 10 and FIGS. 17 of second figure sequence 12, is applied to the document. The position of the security element composed of the figures of first figure sequence 10 and second figure sequence 12 is freely selectable on the document.

Figure 2:
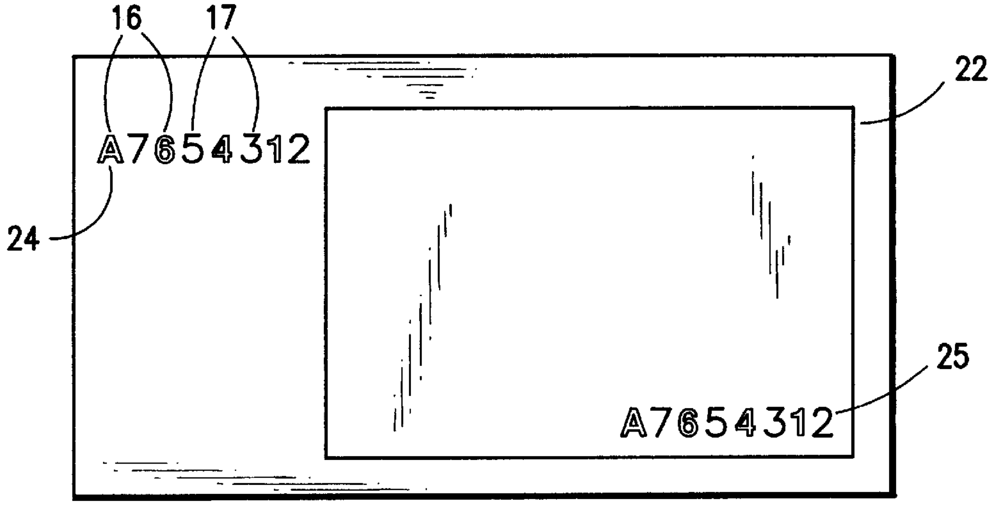
FIG. 2 shows a data carrier with an inventive security element.

In a preferred embodiment, which is shown in FIG. 2, FIGS. 16 of first figure sequence 10 and FIGS. 17 of second figure sequence 12 are applied to data carrier 22, for example a bank note, so as to be located on a common straight base line. Serial number 24 is applied with the aid of two numbering machines which each contain a blind numbering. This serial number then constitutes the security element consisting of two parts. The first part represents the serial number incompletely, consisting for example of the figure sequence "A 6 4 1". The second part likewise represents the applied serial number incompletely, consisting in this example of the figure sequence "7 5 3 2". The two parts of the security element are applied to the bank note in such a way that the individual figures from the two numbering machines follow each other alternatingly and together to form complete the serial number 24. Since different numbering machines are used for applying the two parts, it is possible to produce serial number 24 on document 22 which, as indicated in the present example, altematingly has different colors for the individual figures of the serial number if the two numbering machines are colored differently. Since each numbering machine is usually inked with only one color, the figures printed by one numbering machine have the same color.

As shown in FIG. 2, the serial number can also be provided on the bank note several times if the numbering station is suitably designed, serial numbers 24 and 25 being applied to bank note 22 in the way described above. Serial number 24 can be applied for example with two different colors, such as black and red, while serial number 25 can have another color combination, such as green and blue.

Figure 3:
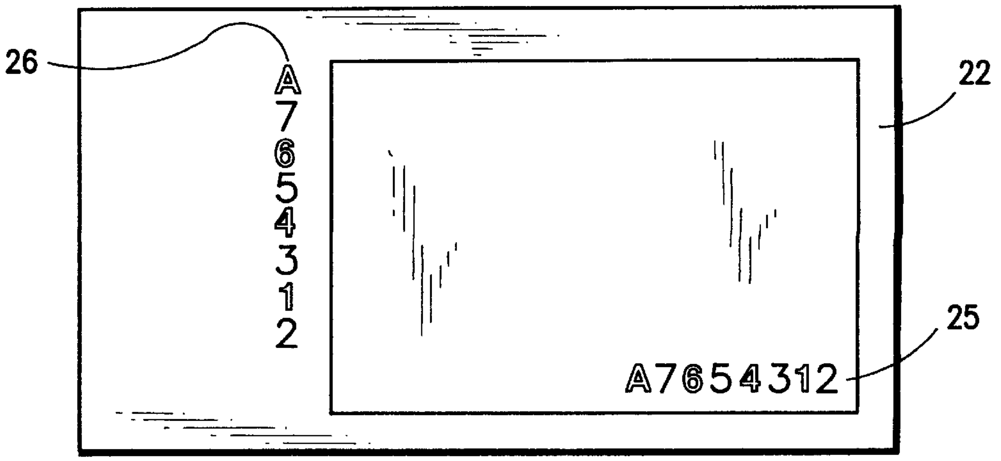
FIG. 3 shows a data carrier with an inventive security element.

If one uses vertical numbering machines for applying the security element instead of the horizontal numbering machines shown in FIG. 1, it is also possible to apply the security element to the data carrier vertically in the form of serial number 26, as shown in FIG. 3. If the numbering station is suitably designed, it is also possible to provide data carrier 22 with a plurality of such security elements, whereby one can also combine vertically applied security elements 26 with horizontally applied security elements in the form of serial number 25 on bank note 22 according to FIG. 3.

Figure 4:
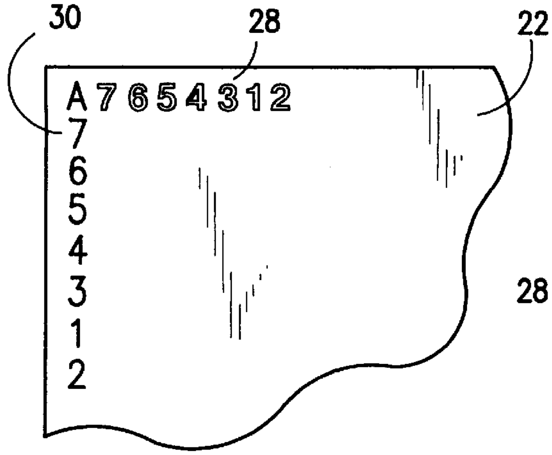
FIG. 4 shows a detail of a data carrier with an inventive security element.

In a further embodiment, as shown in FIG. 4, the first part of security element 28 representing the serial number incompletely and consisting for example of the figure sequence "7 6 5 4 3 1 2" is combined with the second part of security element 30 in such a way that the positionally accurate arrangement of the two parts of security element 28 and 30 causes the first part of security element 28 to be supplemented by the first figure ("A") of the second part of security element 30 to form the complete serial number. To attain this, one provides first and second numbering machines in the numbering apparatus, the first numbering machine having the serial number incompletely, i.e. a blind figure being inserted at one place, in the present case at the first place. The second numbering machine is executed in the present case as a vertical numbering machine and comprises the complete serial number without blind numbering. The document is then guided within the numbering station in such a way that after application of the first part of security element 28 the second part of security element 30 is applied to bank note 22 in an accurate position, so that first part 28 is supplemented by a figure of second part 30 to form the complete serial number.

Figure 5:
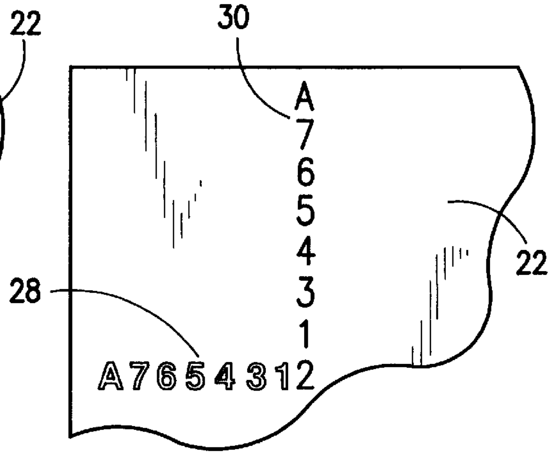
FIG. 5 shows a detail of a data carrier with an inventive security element.

The same applies to the embodiment shown in FIG. 5, which shows that the first part of security feature 28 can be supplemented by placing the second part of security element 30 basically any place on the data carrier 22. In the example according to FIG. 5, the figure sequence "A 7 6 5 4 3 1" is supplemented on document 22 by the last figure "2" of the second part of security feature 30 to form the complete serial number.

Figure 6:
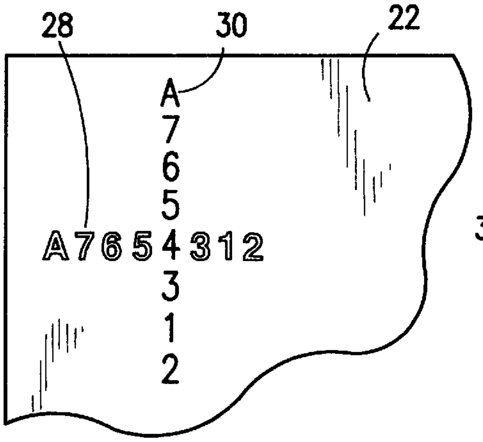
FIG. 6 shows a detail of a data carrier with an inventive security element.

In a further embodiment according to FIG. 6, the security element is executed in such a way that the first part of the security element crosses the second part of the security element and the first part is supplemented by the second part to form the complete serial number. This means that the first part of security element 28, which has the serial number only in part, is combined with the second part of security element 30, which has the serial number completely, in such a way that the figure sequence of the first part is supplemented by at least one figure of the second part to form a complete serial number.

The security element provided on the data carrier in this way gives considerably higher protection from imitation since the two parts of the security element must be applied in an accurate position relative to each other, which can be done exclusively with special high-precision machines.

Figure 7:
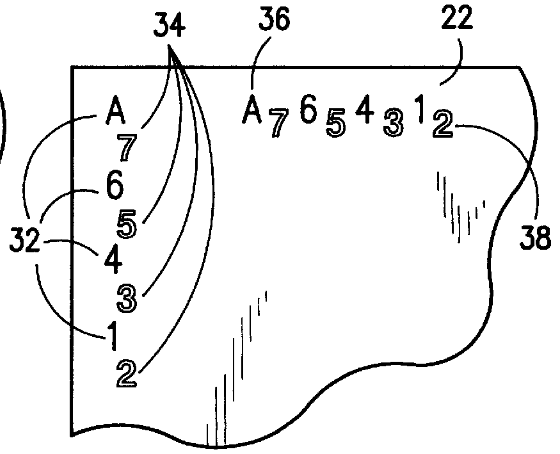
FIG. 7 shows a detail of a data carrier with an inventive security element.

FIG. 7 shows a further possibility of disposing the first and second parts of the security element on the document in such a way as to considerably increase the forgery-proofness of the document. The first part of the element consists of FIGS. 32 or 36 which are applied to document 22 vertically or horizontally along a common base line in each case. Offset from this base line the second part of security element 34 or 38 is provided on document 22 in each case. FIGS. 32 and 34 or 36 and 38 are disposed in their position relative to each other in such a way as to be interlaced with each other and offset from each other, the two parts together forming the complete serial number.

Figure 8:
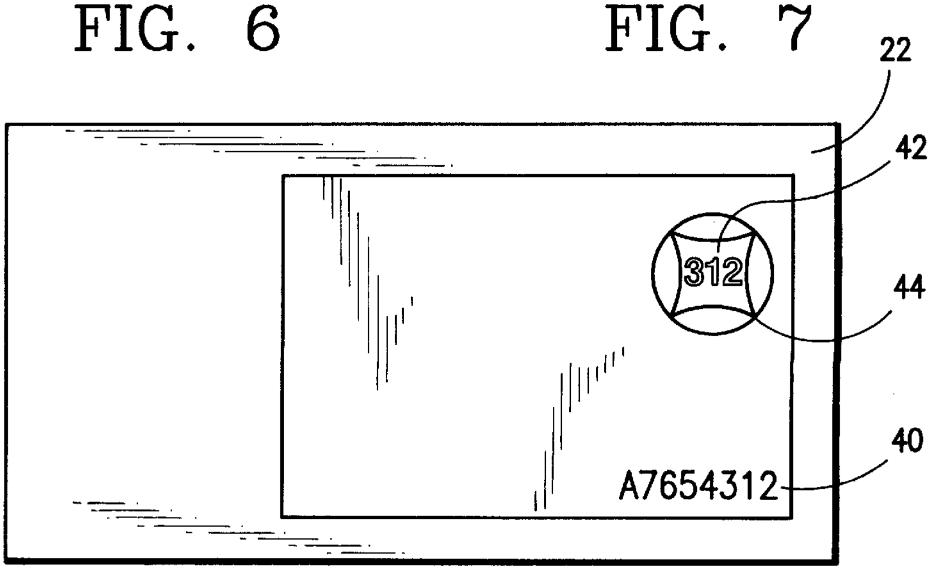
FIG. 8 shows a data carrier with an inventive security element.

In a further embodiment, bank note 22 is shown in FIG. 8 as a data carrier having the inventive security element. As the first part of security element 42 the figure sequence "3 1 2" is shown, being integrated into graphic element 44 in the present case. As the second part of security element 40 the complete serial number is applied to the data carrier. First part 42 and second part 40 together form the security element, first part 42 representing only part of the complete serial number. In the present example, first part 42 represents the last three figures of the serial number, so that these can be provided on the data carrier for example as additional check figures, thereby considerably impeding imitation of the data carrier. This holds true in particular when these check figures are integrated into an element which is difficult to imitate graphically. Although first part 42 of the security element represents the last three figures of the serial number in the present example, it is also possible to provide a single figure of the serial number or any, even noncontiguous, figure sequence of the serial number at any place on document 22 and to use this as a check number. In this case, the first part of the security element forms a check number which is individual only for a certain number of documents and whose correctness can immediately be recognized by comparison with the second part of the security element.

As in all other stated examples, it is also possible to execute the two parts of the serial number in the same or in different colors. Any color combinations can thereby be used. One can also use metallic luster, fluorescent, phosphorescent, magnetic or electroconductive inks, which in particular improves the automatic processibility or machine readability of the documents. Furthermore, one or both parts of the security element can be provided on the document as so-called blind prints, i.e. as prints without ink transfer.

The security feature can be provided on a data carrier in one or more of the stated variants one or more times.

It is especially simple to apply the security element to a data carrier if the latter is present as a multiple-copy panel, for example as a sheet. This sheet is then supplied to a numbering station, the first and then the second part of the security element being applied simultaneously to each individual data carrier of the sheet one after the other.

The order in which the first and second parts of the security element are applied to a document is irrelevant. For the inventive security element it is only necessary to apply the two parts of the security element in the desired defined position relative to each other, this being particularly facilitated by a numbering station through which the sheet or each individual data carrier is guided in such a way as to ensure positionally accurate application of the two parts of the security element.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

What is claimed is:

1. A data carrier comprising:

a document of value;

at least one security element having a serial number that individualizes said data carrier out of a series of data carriers; and said security element comprising first and second parts, the first part of said security element partly representing said serial number, and the second part of said security element representing said serial number either partly or completely, and said at least one security element applied on said document.

2. The data carrier as claimed in claim 1, wherein the second part represents the serial number completely and the first part of the security element is supplemented by the second part of the security element to form a complete serial number.

3. The data carrier as claimed in claim 2, wherein the first part of the security element is supplemented by a figure of the second part to form a complete serial number.

4. The data carrier as claimed in claim 1, wherein the first and second parts of the security element are disposed perpendicular to each other.

5. The data carrier as claimed in claim 1, wherein the serial number is represented by figures and the second part represents the serial number only partly and the first part of the security element has part of the figures of the serial number and the second part of the security element has part of the figures of the serial number, and the two parts are disposed on the data carrier in such a way as to form a complete serial number.

6. The data carrier as claimed in claim 5, wherein the serial number is represented by figures and the second part of the security element has a part of the figures of the serial number which is different from the first part of the security element, and the two parts are disposed on the data carrier in such a way as to form together the complete serial number.

7. The data carrier as claimed in claim 5, wherein the first and second parts of the security element are disposed offset from each other.

8. The data carrier as claimed in claim 1, wherein the first and/or second parts of the security element have a fluorescent color.

9. The data carrier as claimed in claim 1, wherein the first part of the security element has a different color from the second part.

10. The data carrier as claimed in claim 1, wherein a portion of the security element can be used as a check number.

11. The data carrier as claimed in claim 1, wherein the second part of the security element represents the serial number completely and the first part of the security element can be used as a check number.

12. The data carrier as claimed in claim 1, wherein the security element is provided on the data carrier more than once.

13. A method for producing a data carrier comprising the steps of:

providing a document of value; and applying at least one security element having a serial number on said document, wherein said serial number individualizes said data carrier from a series of data carriers and said security element comprises first and second parts, the first part of said security element partly representing said serial number and the second part of said security element representing said serial number partly or completely.

14. The method for producing a data carrier as claimed in claim 13, wherein in the step of applying the security element, the first and second parts of the security element are disposed on the data carrier in such a way that the first part is supplemented by the second part to form the complete serial number.

15. The method for producing a data carrier as claimed in claim 13, wherein in the step of applying the security element, the serial number is represented by figures and the first part of the security element has one part of the figures of the serial number and the second part of the security element has a second part of the figures of the serial number, and the two parts are applied to the data carrier to complete the serial number.

16. The method for producing a data carrier as claimed in claim 13, wherein in the step of applying the security element, the first and second parts of the security element are applied perpendicular to each other.

17. The method for producing a data carrier as claimed in claim 13, wherein in the step of applying the security element, the first and second parts of the security element are applied offset from each other.

18. The method for producing a data carrier as claimed in claim 13, wherein different color from the second part.

19. The method for producing a data carrier as claimed in claim 13, wherein in the step of applying the security element, the first and/or second parts of the security element are applied in a fluorescent color.

20. The method for producing a data carrier as claimed in claim 13, wherein in the step of applying the security element, the first part of the security element is applied in a different color from the second part.

21. The method for producing a data carrier as claimed in claim 13, wherein in the step of applying the security element, the first and/or second parts of the security element are applied with a numbering machine having figure wheels.

22. The method for producing a data carrier as claimed in claim 21, wherein in the step of applying the security element, at least one figure wheel of the numbering machine has blind figures so that no figures are transferred to the data carrier at these places.

* * * * *